UNITED STATES PATENT OFFICE.

ANTON PAOLO JAEGER, OF CHRISTIANIA, NORWAY, ASSIGNOR, BY MESNE ASSIGNMENTS, TO TITAN CO. A/S., OF CHRISTIANIA, NORWAY.

MANUFACTURE OF WHITE PIGMENTS.

1,317,164. Specification of Letters Patent. Patented Sept. 30, 1919.

No Drawing. Application filed December 5, 1916. Serial No. 135,148.

*To all whom it may concern:*

Be it known that I, ANTON PAOLO JAEGER, a subject of the King of Norway, and resident of Christiania, Norway, have invented certain new and useful Improvements in the Manufacture of White Pigments; and I do hereby declare the following to be a full, clear, and exact description of the invention, such as will enable others skilled in the art to which it appertains to make and use the same.

This invention relates to white pigments, the essential component of which is a titanium oxygen compound. The purpose of the invention is the production of an improved pigment of this class and of a paint formed therefrom.

The titanium oxygen compounds of a white color which have been manufactured and prepared according to certain processes hitherto employed possess excellent properties as pigments. One of these processes comprises the step of heating titanium oxygen compounds to a sintering or smelting temperature in the presence of various chemicals, such as sodium chlorid or other halogen compounds. It has been found, however, that titanium pigments manufactured according to one method or another frequently have an injurious effect upon the linseed oil or other vehicle used in preparing paints from them.

Thus in certain instances it has been found that a paint manufactured from titanium oxygen compounds of one kind or another and a vehicle such as linseed oil, turpentine, etc., after being applied to a surface dries and at first gives a bright and hard coating, but on exposure to the elements for a considerable time undergoes disintegration and becomes dull and chalks.

The present invention aims to overcome this disadvantage by mixing with the oxygen compounds a white and relatively insoluble compound of another metal, or mixtures of such compounds. The additions may, for instance, consist of zinc white, white lead, calcium carbonate, etc., or mixtures thereof. Only a small percentage of the substance to be added is necessary to prevent the undesired disintegration and when thus employed the substance does not to any considerable extent show its own special properties in the paint. However, if it is desired that the paint possess qualities characteristic of the added substance, the same may be employed in greater quantity and still perform the function herein sought to be accomplished.

In the following example the titanium oxygen compound selected for treatment is a hydrate containing about 2½ per cent. phosphoric acid in a free or combined state, and zinc white is selected as the material to be added thereto, but it is to be understood that the example is given for clearness of understanding and that the invention is not intended to be limited thereto nor to the materials chosen for illustrative purposes.

The hydrate is placed in a suitable container, such as a chaser, and zinc white is added thereto, the latter in quantity depending upon the character of product sought. About 5 per cent. by weight of the zinc white has been found to produce a marked improvement so far as the prevention of disintegration is concerned. The hydrate and zinc white are intimately mixed. Assuming that an uncalcined pigment is desired, the mixture is then reduced to a stiff paste by the addition of raw linseed oil— say 10 per cent. by weight of the hydrate and zinc white. After thorough mixing additional linseed oil is added in quantity sufficient to produce a paste of a consistency adapted to be ground in a paint mill. After grinding, the paste may be reduced to a convenient consistency for painting, by means of a suitable vehicle such as linseed oil, turpentine, etc.

The composition of the pigment produced in accordance with this invention of course depends upon the materials employed in its manufacture. In the specific example given the pigment comprises essentially titanium oxid, zinc white, small percentages of water of hydration, and phosphoric anhydrid, together with traces of iron or other impurities, such as sulfuric anhydrid, which may have been present in the original titanium oxygen compound. When incorporated with a suitable vehicle to form a paint the latter is characterized by great hiding power, satisfactory stability against the action of light, and durability when exposed to the disintegrating action of the elements.

No claim is herein made to the preferred initial material employed herein, i. e., to the titanium oxygen compound containing combined phosphorus, as the same is the invention of another.

The foregoing detailed description has been given for clearness of understanding and no undue limitation should be deduced therefrom, but the appended claims should be construed as broadly as permissible in view of the prior art.

What I claim as new and desire to secure by Letters Patent is:

1. The process of producing a material suitable for use as or in the manufacture of a pigment and containing combined titanium, combined phosphorus and zinc white, which comprises mixing a titanium oxygen compound containing phosphorus with zinc white.

2. As a new and useful article of manufacture, a pigment comprising titanium oxid, combined phosphorus and zinc white.

3. As a new and useful article of manufacture, a pigment comprising a titanium oxygen compound and not less than five per cent. of zinc white formed by mixing a titanium oxygen compound with zinc white.

4. As a new and useful article of manufacture, a pigment comprising titanium oxid, water of hydration, phosphoric anhydrid and zinc white.

5. As a new and useful article of manufacture, a pigment comprising titanium oxid, water of hydration, combined phosphorus, and not less than five per cent. of zinc white.

6. As a new and useful article of manufacture, a paint consisting of a vehicle and a pigment comprising titanium oxid, water of hydration, and zinc white, the zinc white being chemically uncombined with the titanium.

In testimony that I claim the foregoing as my invention I have signed my name in presence of two subscribing witnesses.

ANTON PAOLO JAEGER.

Witnesses:
STEPHEN T. CLARKE,
F. W. GURNEE.